Jan. 28, 1969  H. L. TRAUTMANN  3,424,046
MANUALLY OPERATED SHEARING APPARATUS
Filed Aug. 25, 1966
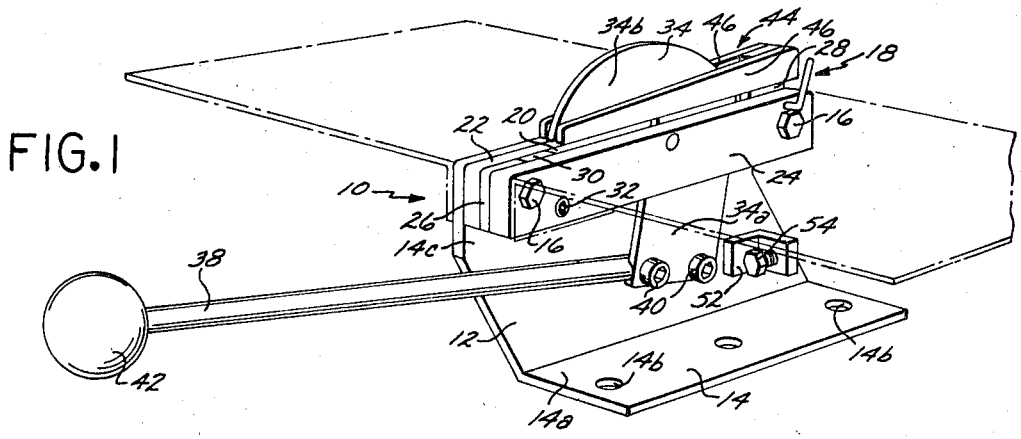
FIG.1
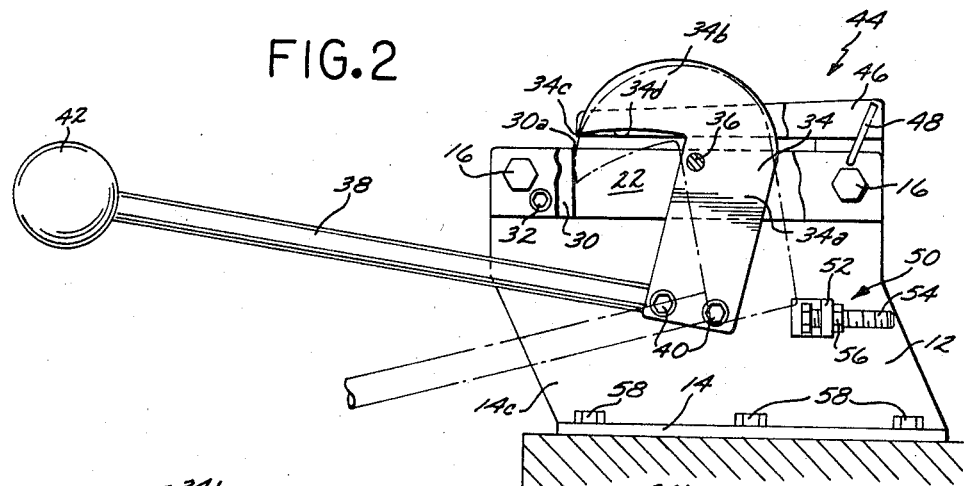
FIG.2
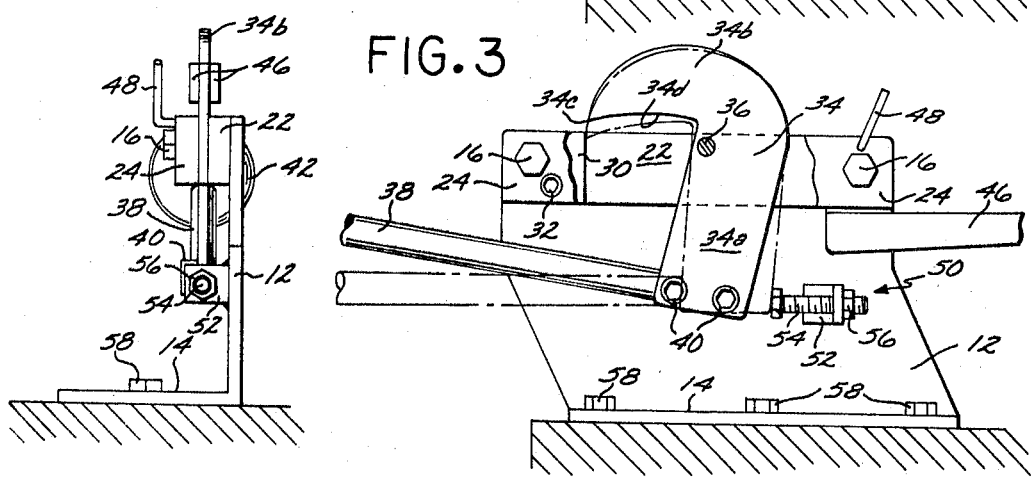
FIG.3
FIG.4
INVENTOR.
HERBERT L. TRAUTMANN
BY
ATTORNEY

United States Patent Office 3,424,046
Patented Jan. 28, 1969

3,424,046
MANUALLY OPERATED SHEARING APPARATUS
Herbert L. Trautmann, 873A W. 15th St.,
Newport Beach, Calif. 92660
Filed Aug. 25, 1966, Ser. No. 575,144
U.S. Cl. 83—545
Int. Cl. B26d 5/10; B23d 15/08
6 Claims

ABSTRACT OF THE DISCLOSURE

A manually operated shearing apparatus having a stationary cutting element with a pair of flat side members and an end member interconnecting the side members to form a U-shaped cutting edge. A pivotally mounted cutter element cooperates with the stationary blade to sever a workpiece.

---

The present invention relates generally to manually operated shearing apparatus, and more particularly to medium duty equipment for shearing and cutting metal as well as other types of materials.

For a considerable number of years there has existed metal cutting equipment of both the heavy duty and light duty types. Heavy duty equipment has taken the form of relatively large power-operated metal shears, whereas light duty equipment has ranged all the way down to hand-operated tin snips and the like.

For certain applications, however, medium duty equipment is desirable particularly in workshops where many different types or varieties of cuts are to be made in metal, plastic or other materials. Such medium duty equipment, it has been realized for sometime, should be so constructed as to be capable of being firmly mounted on a given workbench or other support means. It should comprise cutting means whereby different shapes and forms of cut can be quickly and easily provided in metals of different thickness.

To theset ends the present invention has been provided to produce manually operable shearing apparatus wherein relatively large amounts of cutting pressure can be generated, and wherein various different types of cuts can be effected.

It is an object of the present invention to provide manually operated shearing apparatus having a rotatable cutting element which is formed with a cutting edge or point for effecting punching operations in metal.

A further object of the present invention is to provide manually operated shearing apparatus as characterized above, having a generally U-shaped stationary cutting edge and a cutting element having a complementally shaped cutting portion for cooperation therewith.

A further object of the present invention is to provide shearing apparatus as characterized above, having guard means for properly holding the material to be cut during the shearing operation.

A still further object of the present invention is to provide shearing apparatus as characterized above, which is so constructed as to enable internal sections of the metal to be cut away without disturbing the peripheral or adjacent external portions thereof.

An even further object of the present invention is to provide shearing apparatus as characterized above, wherein limit means is provided for controlling the amount and depth of shearing cut effected.

Another object of the present invention is to provide shearing apparatus as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of shearing apparatus according to the present invention;

FIGURE 2 is a fragmentary side elevational view of the apparatus of FIGURE 1, showing the cutting element in several positions;

FIGURE 3 is a fragmentary elevational view similar to FIGURE 2, showing the apparatus in different positions; and FIGURE 4 is an end elevational view of the subject apparatus.

Like reference characters indicate corresponding parts throughout the several views of the drawings.

Referring to the drawings, there is shown therein a preferred embodiment 10 of shearing apparatus according to the present invention. Such apparatus comprises a base 12 which may be formed in any desired manner, but is shown in the drawings as comprising a generally L-shaped frame member 14. Such frame has a horizontal or mounting portion 14a formed with suitable mounting holes 14b whereby the apparatus can be firmly secured to a bench or other stationary support means in the usual manner.

Such frame is further provided with a vertical portion 14c to which is attached, by means of fastening bolts 16, means 18 forming a cutting or shearing opening 20. Such means 18 may comprise various different structural elements, but is shown in the drawings as comprising a pair of relatively flat side members 22 and 24 held in spaced relation by end spacers 26 and 28.

As shown most clearly in FIGURES 1 and 4 of the drawings, the side member 22 is positioned against the upstanding flange portion 14c of frame 14. Such side member 22 should be flush with the upper edge of said flange 14c, as will be readily apparent to those persons skilled in the art.

The end spacers 26 and 28 are then positioned adjacent the side member 22, and the member 24 is then placed adjacent the said spacers. The fastening bolt 16 extends through aligned openings in the side members 22 and 24, and spacers 26 and 28, as well as the vertically disposed flange 14c.

The spaced side members 22 and 24 provide the shearing edges of the opening 20. However, in order to provide a strong forward cutting edge for such opening, a stationary cutting tool 30 is removably positioned between the side members 22 and 24. A set screw 32 threadedly anchored within a suitable threaded opening in member 24 is utilized to facilitate removal and replacement of the cutting tool 30 as will hereinafter become more apparent. A horizontally disposed cutting edge 30a on such tool completes the generally U-shaped cutting edge for the opening 20.

Pivotally disposed within thhe opening 20 is a cutting element 34 having a mounting portion 34a and a cutting portion 34b. A rivet or pivot pin 36 extends through suitable openings in the side members 22 and 24 as well as through an opening in the mounting portion 34a of cutting element 34.

The cutting element 34 is generally L-shaped although disposed in an inverted fashion to cause the cutting portion 34b to be disposed above the opening 20 when in its retracted position. Such cutting element may be formed of any appropriate material, but preferably is formed of relatively hard cutting steel. The side members 22 and 24 should also be formed of relatively hard steel to provide hard cutting or shearing edges for the opening 20. The tip or forward cutting edge 34c of cutting portion 34b initially engages the cutting opening 20 at the stationary cutting edge 30a of cutting tool 30. To accomplish this, the undersurface 34d of cutting portion 34b is arcuately shaped as shown in the drawings.

An operating handle 38 having one end secured to the mounting portion 34a of cutting element 34 by means of screws 40 is utilized for rotating such element. A hand grip 42 is attached to the free end of handle 38 to facilitate the cutting operation as will hereinafter become more apparent.

As shown most clearly in FIGURE 1 of the drawings, a guard 44 is provided having guard members 46 on either side of the cutting element 34. Such guard members are attached to means associated with the spacer 28 so as to be disposed a predetermined distance above the stationary side members 22 and 24 of the opening 20.

To permit the subject shearing apparatus to be used without the guard 44, suitable locking means including handle 48 is provided. By suitable manipulation of such handle, the guard 44 can be caused to pivot from its operating position shown in FIGURES 1 and 2 to its inoperative position shown in FIGURE 3. While in this latter position, the cutting element 34 is unguarded.

For certain types of cutting and punching operations, as will be readily apparent to those persons skilled in the art, adustable limit stop means 50 may be secured to the flange 14c of frame 14. Such stop means may take any desired form but is shown in the drawings as comprising an L-shaped bracket 52 firmly secured to flange 14c as by welding, brazing or the like. A limit stop member 54 which may take the form of a bolt is threadedly positioned in the extended flange of such bracket 52, and a fastening nut 56 is secured to the end thereof for locking purposes.

It is a simple matter to loosen nut 56 to permit bolt 54 to be repositioned with respect to bracket 52. When in the position shown in FIGURE 3 of the drawings, such bolt 54 engages the mounting portion 34a of cutting element 34 to limit the cutting action as will hereinafter be explained. However, when it is desired to have unlimited cutting action afforded by cutting portion 34b, it is a simple matter to position the bolt 54 as shown in FIGURE 2. In either event, the nut 56 can be employed to lock the bolt 54 in the desired position.

The frame 14 is firmly secured to any bench, table or other support means by means of fastening bolts or screws 58 in the openings 14b. The metal, plastic or other material to be cut is inserted between the undersurface 34d of cutting portion 34b and the upper edge of the side members 22 and 24. With the workpiece in such position, pressure exerted downwardly on the hand grip 42 causes cutting element 34 to be pivoted in a counter-clockwise direction as shown in FIGURES 2 and 3.

If it is desired to cut through the material for the length of cutting portion 34b, the action of cutting element 34 should be unlimited as shown in the broken lines in FIGURE 2. However, the tip or forward cutting edge 34c of such cutting portion 34b first engages and shearingly passes the stationary cutting edge 30a of tool 30. Thereafter, the side edges of the cutting portion 34b shearingly engage the cutting or shearing edges afforded by stationary members 22 and 24.

In the event it is desired to merely remove a portion from the center of a piece of sheet metal, plastic or the like, the limit stop 50 should be adjusted to the proper position. Thereafter, the forward cutting tip 34c of cutting portion 34b will be permitted to engage the cutting opening 20 only a predetermined amount. This will provide a U-shaped cut in the metal in accordance with the amount of insertion of the cutting portion into the opening 20. Thereafter, if it is desired to remove the metal entirely, it is a simple matter to rotate the workpiece 180 degrees and thereafter perform the same operation on the rear portion of the U-shaped cutout. That is, the cut can thereby be completed so as to cause the central portion of the metal or plastic to be removed in its entirety.

It is thus seen that the present invention effectively performs a punching operation as well as a shearing operation. As will be readily apparent to those persons skilled in the art, the subject apparatus is capable of cutting notches, tabs and other desired configurations, in accordance with the shape or construction of the cutting edge of the opening 20, and the shape or construction of the cutting portion 34b of the shearing apparatus.

As shown in broken lines in FIGURE 1 of the drawings, it is contemplated that suitable side arms or table means may be provided to support the work during the shearing operation.

It is thus seen that the present invention provides shearing apparatus which is capable of cutting into several small pieces of a relatively large sheet of metal or plastic merely by the application of successively small cuts. Also, the subject apparatus is capable of notching and punching such material, limited only by the shape and design of the cutting element and the stationary cutting edge for shearing cooperation therewith.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. Manually operated shearing apparatus comprising in combination, a base to be secured in a relatively stationary position, means on said base forming a vertical opening and comprising a pair of spaced relatively flat side members fixed to said base and an end member interconnecting said side members to form a U-shaped cutting edge, a generally L-shaped cutting element having a portion pivotally mounted in said opening about a horizontal axis and a cutting portion movable into and out of said opening upon pivoting of said element, said cutting portion of said element being of such size and shape as to have a close fit with said cutting edge, and handle means fixed to said cutting element to effect pivotal movement thereof, whereby material between said cutting portion and said opening is caused to be sheared along said side and end members upon operation of said handle means.

2. Manually operated shearing apparatus according to claim 1, wherein said cutting portion of said cutting element is arcuately shaped to permit the end of said cutting portion to pass said end member prior to its passing the side members of said opening means.

3. Manually operated shearing apparatus according to claim 2, wherein adjustable stop means is provided on said base to limit pivotal movement of said cutting element as desired to thereby limit the shearing action of the sides of the cutting portion.

4. Manually operated shearing apparatus according to claim 3, wherein a removable guard is provided for holding the material to be cut over the means forming the opening.

5. Manually operated shearing apparatus according to claim 4, wherein said guard is operable on opposite sides of said cutting portion of said cutting element to maintain the material in proper position for the shearing operation.

6. Manually operated shearing apparatus according to claim 5, wherein said base is generally L-shaped affording a horizontal flange and a vertical flange to which said opening means and cutting element are firmly secured.

References Cited

UNITED STATES PATENTS

| | | | |
|---|---|---|---|
| 268,440 | 12/1882 | Trowbridge | 83—917 X |
| 1,805,399 | 5/1931 | Hendrick | 83—607 |
| 3,180,194 | 4/1965 | Locke | 83—607 X |
| 3,279,295 | 10/1966 | Teplitz | 83—607 X |

JAMES M. MEISTER, *Primary Examiner.*

U.S. Cl. X.R.

083—605, 916, 597